United States Patent [19]

Kemeny

[11] 4,096,345
[45] Jun. 20, 1978

[54] VERTICALLY ALIGNED GAS INSULATED TRANSMISSION LINE

[75] Inventor: George A. Kemeny, Sudbury, Mass.

[73] Assignee: Westinghouse Electric Corp., Pittsburgh, Pa.

[21] Appl. No.: 782,477

[22] Filed: Mar. 29, 1977

[51] Int. Cl.² ............................................. H01B 9/04
[52] U.S. Cl. .................................... 174/14 R; 174/28; 174/16 B; 174/100
[58] Field of Search ...................... 174/14 R, 16 B, 28, 174/29, 99 B, 100

[56] References Cited

U.S. PATENT DOCUMENTS

| | | |
|---|---|---|
| 3,864,507 | 2/1975 | Fox et al. ............................ 174/14 R |
| 3,898,367 | 8/1975 | Nakata ................................ 174/14 R |
| 4,029,890 | 6/1977 | Nakata ................................ 174/14 R |
| 4,029,891 | 6/1977 | Nakata ................................ 174/14 R |
| 4,029,892 | 6/1977 | Nakata ................................ 174/14 R |
| 4,034,147 | 7/1977 | Clark et al. ......................... 174/14 R |

*Primary Examiner*—Arthur T. Grimley

*Attorney, Agent, or Firm*—M. S. Yatsko

[57] ABSTRACT

A vertically aligned gas insulated transmission line includes an elongated cylindrical outer sheath with an elongated cylindrical inner conductor disposed within the outer sheath. An insulating gas is disposed within the outer sheath and support means are utilized for supporting and centering the inner conductor within the outer sheath. In one embodiment, the support means comprises a central member with a bore therethrough having a leg member which extends radially outwardly therefrom which is secured to the outer sheath. The inner conductor extends through the bore, and the leg member has an aspect ratio greater than 1. A second embodiment utilizes for support means a conically shaped insulator which, with the inner conductor, forms an angle therebetween which is less than 26.5°. An additional modification is present wherein a particle trapping region is disposed around the radial periphery of the outer sheath, and means are disposed within the outer sheath for deflecting particles from within the outer sheath to the particle trapping region.

21 Claims, 12 Drawing Figures

VERTICALLY ALIGNED GAS INSULATED TRANSMISSION LINE

BACKGROUND OF THE INVENTION

This invention relates generally to gas insulated equipment and more particularly to vertically-oriented gas insulated transmission lines having means incorporated therein for minimizing the problem of electrical breakdown along the support insulator surfaces.

Compressed gas insulated transmission lines are being used in ever increasing scale in recent years due to the desirability of increasing safety, problems in acquiring right-of-way for overhead lines, and higher power lines required by growing metropolitan areas and growing demands for electrical energy. Compressed gas insulated transmission lines typically comprise a hollow sheath, a conductor within the sheath, a plurality of solid insulating spacers which support the conductor, and a compressed gas such as sulfur hexafluoride or the like in the sheath to insulate the conductor from the sheath. It is also known to provide a particle trap for compressed gas insulated transmission lines as is disclosed in the patent to Trump, U.S. Pat. No. 3,515,939. The particle trap of Trump is used to precipitate out of the insulating gas particles of foreign matter which could adversely affect the breakdown voltage of the dielectric gas.

Although the majority of gas insulated transmission line installations to date have been in a horizontal plane, it is to be expected that, with the increased number of lines being installed, more installations will be made in which the gas insulated transmission line is vertically oriented. This vertical orientation of the transmission line results in problems concerning the presence of conducting particles which problems are not present in horizontally disposed transmission lines. In horizontally disposed transmission lines, low field regions for particle trapping are installed at the bottom of the outer sheath, and gravity and the electric field eventually force these conducting or semiconducting particles into the low field regions where they are trapped or inactivated. In a verticle run of gas insulated transmission lines, particles will, due to gravity, fall down the transmission line and may settle on any insulator surface which blocks the free fall of such particles. The presence of low field regions adjacent the interior surface of the outer sheath would be ineffective to trap and deactivate these particles, as the force of gravity will not preferentially propel particles into such traps. If these particles should lodge on one of the transverse insulating surfaces of the insulators, they may, in turn, lead to initiation of electrical breakdown across the insulator surface followed by a massive short circuit current which will require a costly and time consuming shutdown, repair, or replacement of the equipment. Therefore, it is desirable to provide some means for decreasing the likelihood that the particles which may be present within the outer sheath will lodge on an insulator surface and precipitate electrical breakdown across the insulator.

SUMMARY OF THE INVENTION

In accordance with this invention, it has been found that a more efficient vertically oriented gas insulated transmission line is achieved by providing an elongated cylindrical outer sheath and an elongated cylindrical inner conductor within the outer sheath with an insulating gas electrically insulating the inner conductor from the outer sheath. Support means are included for supporting and positioning the inner conductor in the outer sheath, and the support means comprise a central member having a bore therethrough and a leg member extending radially outwardly from the central member and contacting the outer sheath. The inner conductor extends through the bore in the central member, and the leg member has an aspect ratio which is greater than one. A modification of this transmission line, and more particularly of the support means, is wherein the support means comprises an elongated, conically-shaped insulator having an apex and a base end section, and a centrally disposed bore through which the inner conductor extends. The conically shaped insulator extends radially outwardly to, and is secured to the outer sheath, with the apex end section of the insulator being vertically higher than the base end section of the insulator. The conically shaped insulator and the inner conductor form an angle therebetween from the vertical, and this angle is less than 26.5°, thereby increasing the slope of the insulator such that any particles which may strike the insulator will, due to the force of gravity, travel down the insulator to finally rest adjacent the outer diameter of the insulator adjacent to the outer sheath in an area where the electric field gradient is lower.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
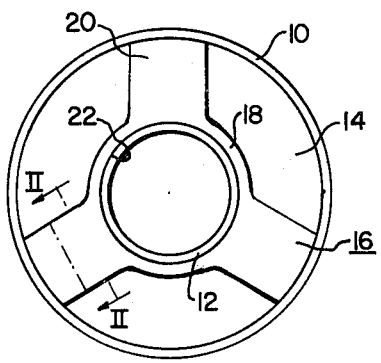
FIG. 1 is an end view of a prior art transmission line and spacer.
Figure 3:
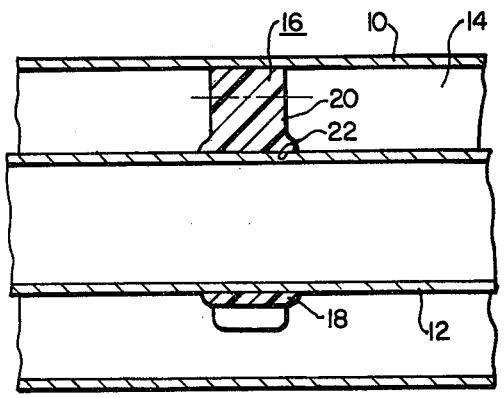
FIG. 3 is an elevational cross-sectional view of the prior art transmission line.
Figure 2:
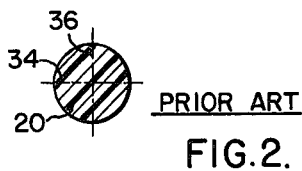
FIG. 2 is the view taken along line II—II of FIG. 1 illustrating the prior art spacer leg.

Referring now more particularly to FIGS. 1-3 therein is shown side, end and cross-sectional views of the typical support insulators utilized in the prior art. As can be seen, the gas insulated transmission line of the prior art generally includes an elongated, cylindrical outer sheath 10, an elongated, cylindrical inner conductor 12 disposed within the outer sheath 10, and an insulating gas 14 typical of which is sulfur hexafluoride which is disposed within the outer sheath 10 and electrically insulates the outer sheath 10 from the inner conductor 12. The typical gas insulated transmission line has the outer sheath 10 at ground or low potential, and the inner conductor 12 is at high electrical potential at voltages typical of which is 121 KV to 800 KV. Supporting and positioning the inner conductor 12 within the outer sheath 10 are typically a plurality of support insulators 16, one of which is shown in the figures. Although referred to herein as support insulators 16, the term also refers to those members which do not physically support the innner conductor but function instead to position the inner conductor within the outer sheath. The construction of both types is the same and the number of each type is dependent on the desires of the designer. The typical support insulator 16 is comprised of a central member 18, and one or more leg members 20. The leg members 20, when viewed in cross section, are shown to be of a generally circular, cylindrical shape. The leg members 20 are generally secured to the outer sheath 10 by an adhesive or any of the numerous means known in the art. Also, the insulators 16 may be slidably attached to the outer sheath 10. The central member 18 has a bore 22 therethrough and the inner conductor 12 extends through this bore 22.

Figure 5:
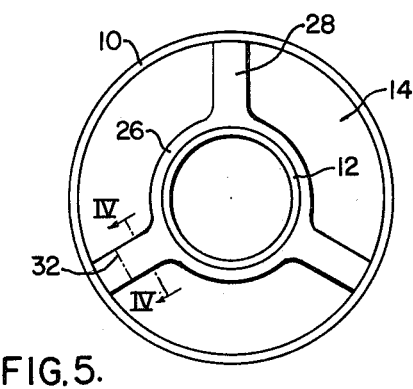
FIG. 5 illustrates an end view of a gas insulated transmission line according to the teachings of this invention.
Figure 4:
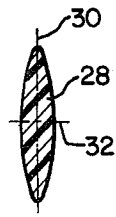
FIG. 4 illustrates a cross-sectional view of the leg member of the support means illustrated in FIG. 5.
Figure 6:
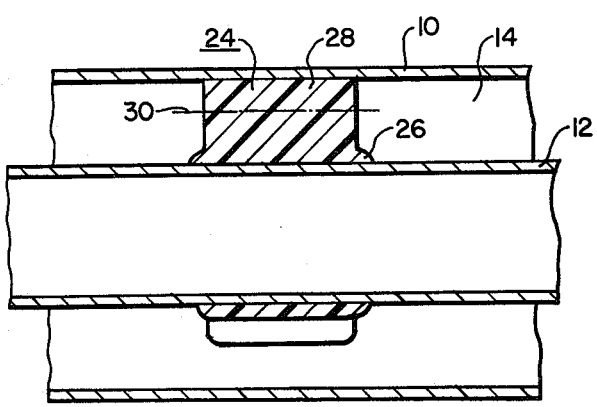
FIG. 6 illustrates an elevational, sectional view of a portion of a compressed gas insulated transmission line.

FIGS. 4–6 are similar to FIGS. 1–3, except they illustrate the teachings of this invention which make the improved support means especially useful in vertical installations of gas insulated transmission lines. (As used in this specification, "vertical" includes those installations at angles to absolutely vertical.) As in the prior art, the outer sheath 10 houses the inner conductor 12, with the insulating gas such as sulfur hexafluoride electrically insulating the inner conductor 12 from the outer sheath 10. Supporting the inner conductor 12 within the outer sheath 10 is the new, improved support means 24. This new support means comprises a central member 26 with one or more leg members 28 which extend from the central member 26 radially outwardly to the outer sheath 10. However, as distinguished from the prior art, the leg members 28 are not circular in cross section; rather, as illustrated, the leg members 28 have a generally ellipsoidal cross section. This elliposoidal cross section of the leg member 28 illustrates how the improved support means 24 is less likely to have deposited thereon a conducting or semiconducting particle which may be present within the outer sheath 10 and the insulating gas 14. As can be seen, the leg member 28 has a major axis 30 and a minor axis 32 which are disposed along the longitudinal and circumferential axes of the transmission line respectively. As such, the surface area which is exposed to a falling particle as it would fall along a vertically aligned transmission line is only that area represented by the minor axis, whereas the larger surface area along the major axis 30 is parallel to the expected path of any falling particle. Therefore, the area upon which the particle is likely to alight is minimized. This is not the case with the prior art circular leg members 20. For the circular leg members 20, the surface area which is exposed to a falling particle is the same regardless of the orientation of the leg member 20, because the major axis 34 and the minor axis 36 of the circular leg member 20 are equal.

Figure 11:
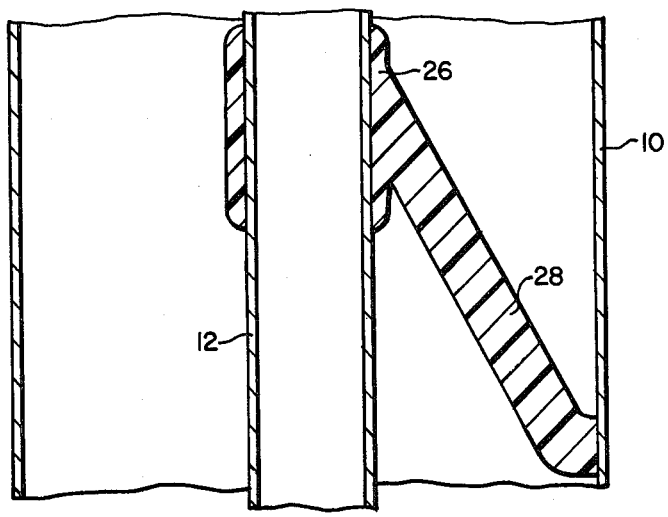
FIG. 11 is an elevational, sectional view illustrating a support means according to the teachings of this invention.

Although described with respect to a ellipsoidal cross section, the leg member 28 may be of any desired shape so long as the aspect ratio, or ratio of major axis 30 to minor axis 32, is greater than one, which is the aspect ratio of the circular leg member 20. By so specifying that the aspect ratio be greater than one, it is assured, for a given support, that the surface presented toward a falling particle for a vertically oriented transmission line is smaller than the surface area which is parallel to the path of travel of the falling particle. Although illustrated in FIGS. 4–6 as having three leg members 28, the support means 24 may comprise only a single leg member 28 as is illustrated in FIG. 11.

Figure 7:
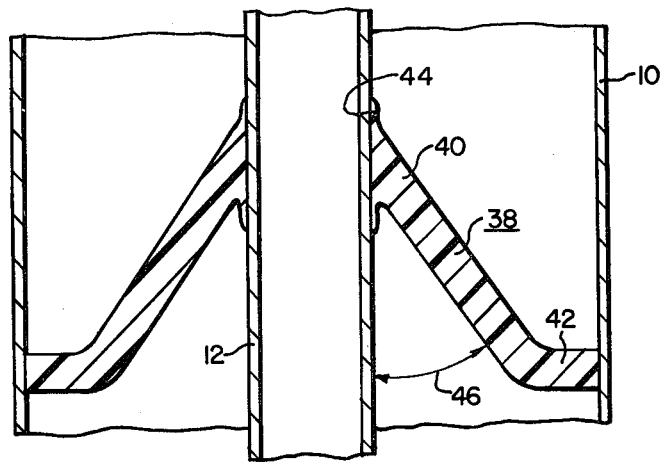
FIG. 7 is a sectional, elevational view of the prior art conical insulator.
Figure 8:
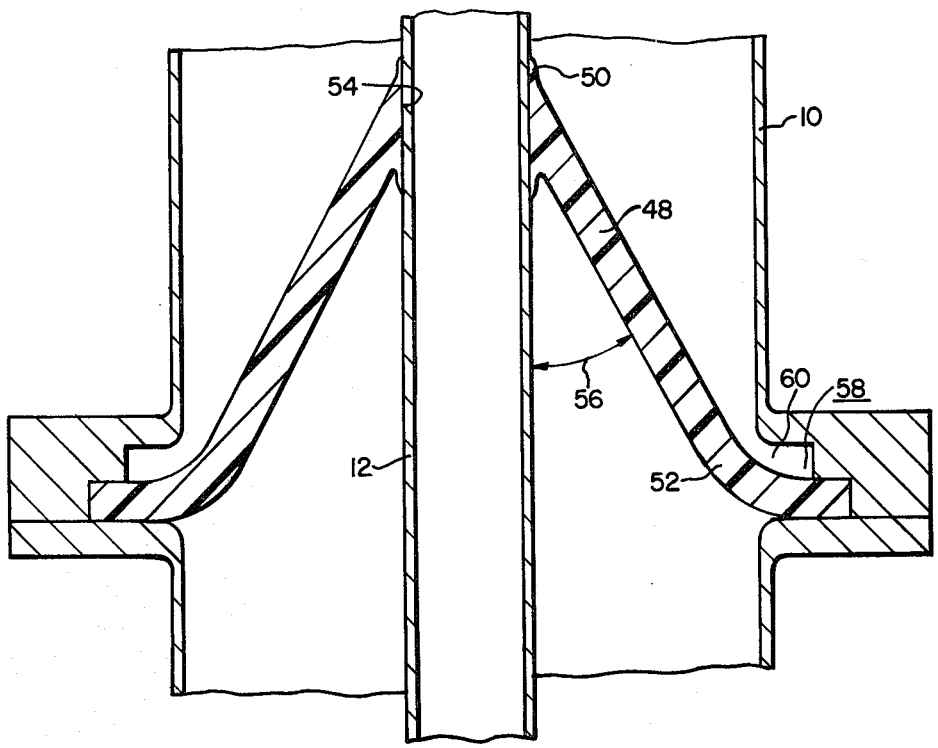
FIG. 8 is an elevation, sectional view of a conical insulator according to the teachings of this invention.

Although the use of a low aspect leg member support means minimizes the surface area, and subsequently the probability of a particle adhering to the insulating support, there is still the likelihood that, for long lengths of vertically oriented gas insulated transmission lines, such as a few hundred feet, a falling particle will still lodge on an insulator surface. For these longer vertical runs, it may be desirable to provide a means within the run for preventing the particle from falling a large distance, thereby minimizing the probability that it will lodge on an insulator surface. FIGS. 7 and 8 illustrate means for preventing such falling particle from traveling great distances.

FIG. 7 illustrates a conical insulator utilized in the prior art which prevent the particle from falling great lengths. As can be seen, the conical insulator 38 has an apex end section 40 and a base end section 42. An opening 44 is disposed through the center of the insulator 38, and the inner conductor 12 extends through this opening 44. The conically shaped insulator 38 extends radially outwardly from the inner conductor 12 to the outer sheath 10, and fills this area between so as to prevent any particles from falling past the insulator 38. The insulator 38 and the inner conductor 12 generally forms an angle 46 therebetween, which angle was typically 26.5°.

FIG. 8 illustrates the modification of the prior art support insulator 38 illustrated in FIG. 7, to provide an insulator 48 which is more efficient for use in vertically oriented transmission lines. As before, the insulator 48 is of a generally conical shape, having an apex end section 50 and a base end section 52, an opening 54 therethrough, and forms an angle 56 with the inner conductor 12. The inner conductor 12 extends through the centrally disposed opening 54, and the insulator 48 extends outwardly to the outer sheath 10. However, the angle 56 which the insulator 48 makes with the inner conductor 12 is less than the 26.5° utilized in the prior art. By so making the angle 56 smaller, the insulator 48 has become elongated, presenting a lesser angle downward to any conducting particles which may be falling along the transmission line. By so lengthening the support insulator 48, the particles which may be present within the transmission line have an increased probability of hitting the insulator 48 and, due to forces of gravity, continuing falling along the insulator surface 48 until such time as the particle is adjacent the outer sheath 10. This is an advantageous position for having the particle rest, as the electric field gradient adjacent the outer sheath 10 is lower than the electric field intensity at points closer to the inner conductor 12. Because the particle is disposed within the lowered-intensity field region, there is a lesser likelihood that it will initiate breakdown across the insulator 48 surface. This moving of the particle to adjacent the outer sheath may also be desirable for post-types spacers, as is illustrated in FIG. 11. There, the post-type leg is also at an angle to the verticle of less than 26.5°.

If desired, it may be advantageous to include particle trapping means 58 at the location where the insulator 52 is secured to the outer sheath 10. As illustrated, these particle trapping means 58 comprise an extension of the outer sheath 10 which extends radially outwardly beyond the remainder of the outer sheath 10 to thereby provide a slot 60 which has a lowered field intensity, as described in the Trump patent, to thereby inactivate particles. In this instance, because the particles would be trapped in a much lower field region, the likelihood of the particle initiating a breakdown across the insulator 48 is greatly minimized. The establishment of a much lower field region 60 is also desirable as this reduces the likelihood of a particle being lifted out of such a region during an unusual voltage surge on the inner conductor 12 during which temporary condition higher than normal electric fields may exist which may cause movement of insufficiently well-trapped particles back into the insulated region between the inner conductor and the outer sheath 10.

Figure 9:
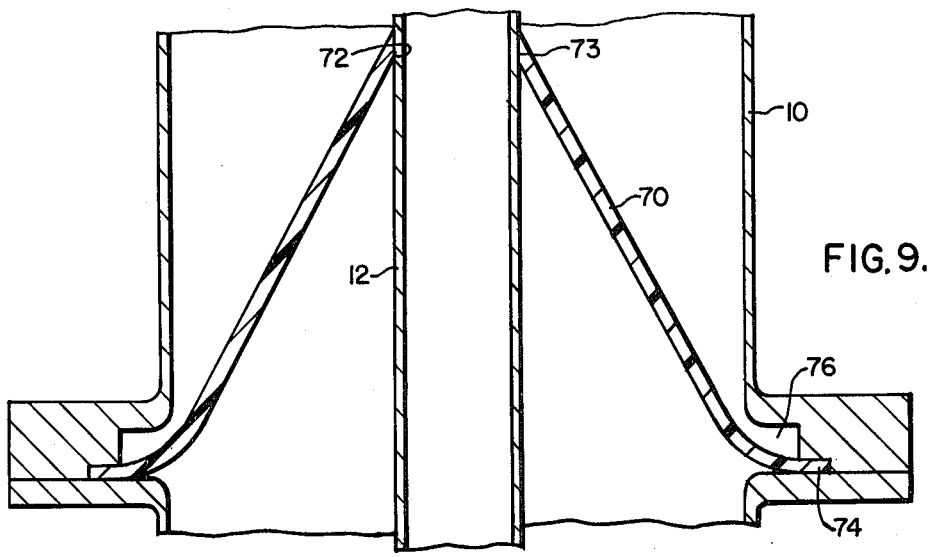
FIG. 9 is a sectional, elevational view illustrating a compressed gas insulated transmission line using deflector means.
Figure 10:
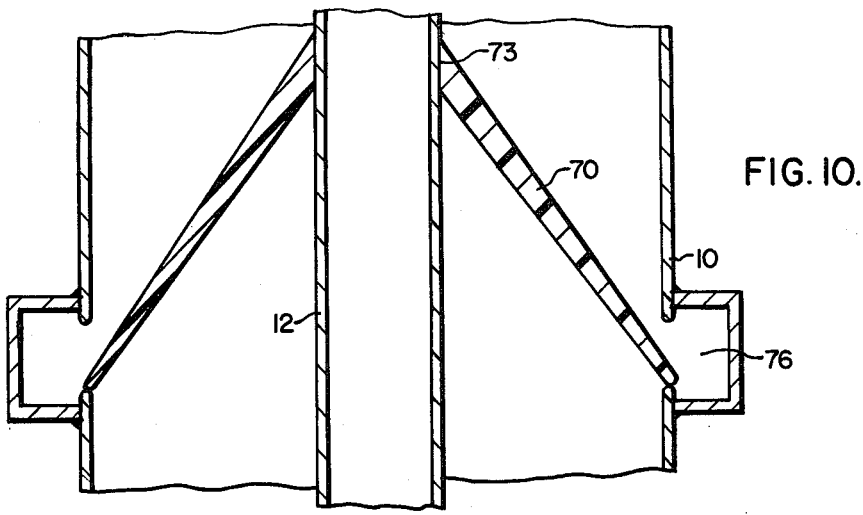
FIG. 10 illustrates a modification of the view shown in FIG. 9.

FIGS. 9 and 10 illustrate an alternative manner of deflecting the particles to regions wherein there is a lesser probability that they will initiate breakdown. In FIG. 9, a conically shaped member 70 is disposed within the outer sheath 10 and contacts the inner conductor 12 through a centrally disposed opening 72. The member 70 is secured to the outer sheath 10, and at the location 74 where it is secured is provided a particle trapping region 76 around the radial periphery of the outer sheath 10, with the particle trapping region 76 communicating with the interior of the outer sheath. The deflecting member 70 does not provide structural support for the inner conductor 12; rather, its entire purpose is to deflect any particles which may be falling down the trasmission line into the particle trapping low field region 76. The member 70 is preferably comprised of a soft plastic, low dielectric constant material such as is marketed under the trademark TEFLON.

FIG. 10 illustrates a modification of the deflecting member 70 of FIG. 9. In this modification, the member 70 is not secured to the outer sheath 10, but instead could be made flexible so as to allow it to be slid into the particle trapping region 76 after the trapping region 76 has been formed. As before, any particles falling along the transmission line will be deflected by the deflecting member 70 into the low field, particle trapping region 76.

Figure 12:
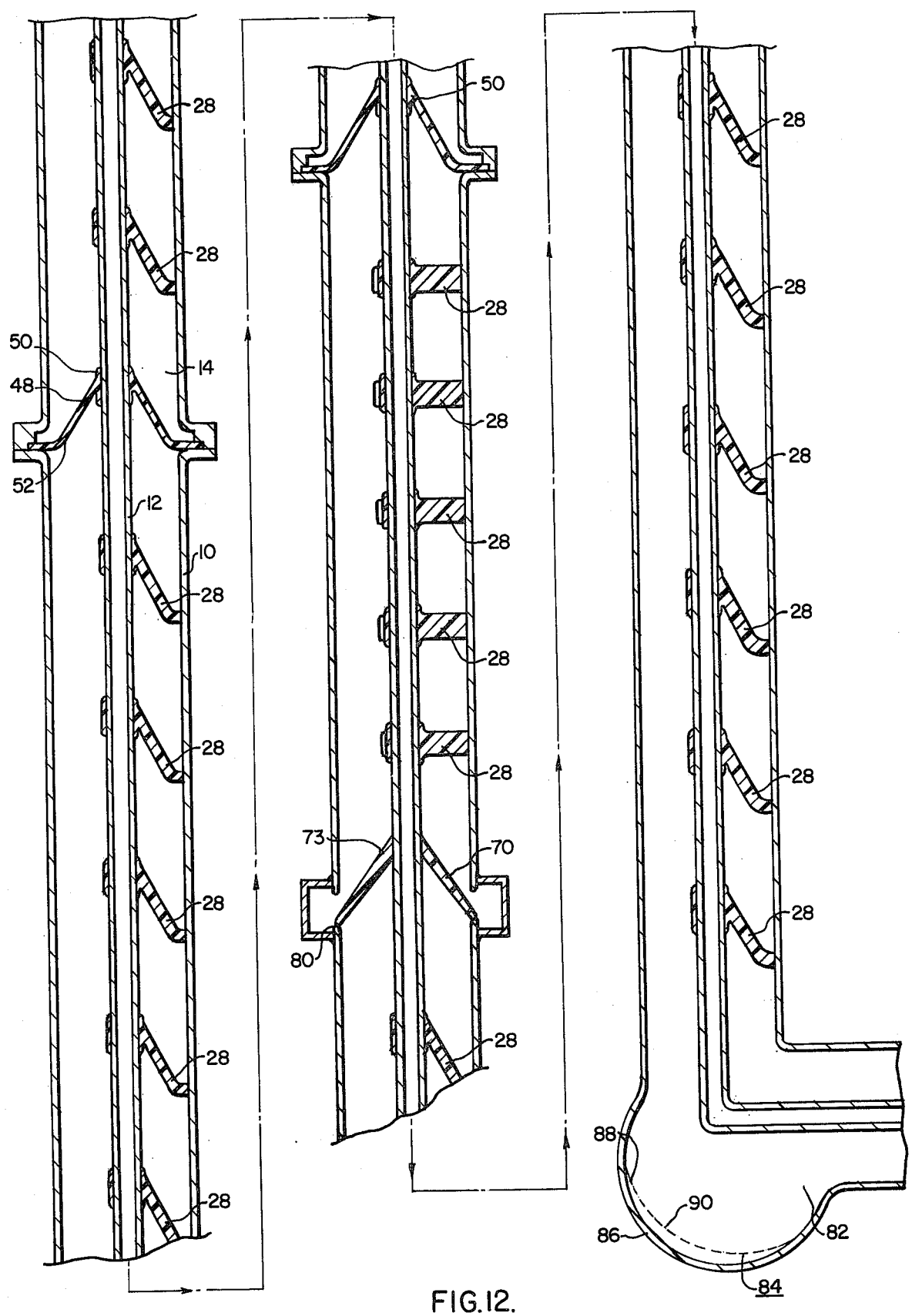
FIG. 12 is an elevational, sectional view of a vertically oriented gas insulated transmission line.

Referring now to FIG. 12, there is schematically illustrated a vertically oriented gas insulated transmission line which is utilizing all the various alternatives heretofore described. Although a transmission line, when installed, typically will not contain every alternative herein described, it is possible to do so if desired. Also, the transmission line may be included at an angle to absolutely vertical. As shown, the elongated conical insulator illustrated in FIG. 8 is provided at spaced-intervals along the transmission line to prevent the particles from traveling too great a distance to thereby descrease the probability that they will lodge on a leg member 28. Also to be noted is that for both the conical insulator 48 and the deflector members 70, the apex end section 50, 73 respectively is higher than the associated base end section 52, 80 respectively. By so having the apex end section being vertically higher than the base end section, there is assured that the particles, upon deflection, will most likely travel to the outer sheath 10 instead of adhering at some intermediate location on the insulator 48 or deflector 70. Also to be noted is that at the lowermost section 82 of the transmission line it may be desirable to install a particle trapping region 84 to trap and deactivate any particles which fall to the bottom of the line. The particle trapping means 84 may, for example, comprise an enlarged radius section 86 of the joint, with a perforated screen or plate 88 spaced therefrom, so that the particles as they fall to the bottom of the transmission line, will pass through the openings 90 in screen 88 into the low field region adjacent to the expanded radial section, thereby being deactivated.

I claim as my invention:

1. A vertically aligned gas insulated transmission line comprising:

an elongated, cylindrical outer sheath;

an elongated, cylindrical inner conductor disposed within said outer sheath;

an insulating gas disposed within said outer sheath and electrically insulating said inner conductor from said outer sheath; and support means for supporting said inner conductor within said outer sheath, said support means comprising a central member having a bore therethrough and a leg member extending radially outwardly from said central member and contacting said outer sheath, said inner conductor extending through said bore, said leg member having an aspect ratio greater than one.

2. The gas insulated transmission line according to claim 1 wherein said leg member is of ellipsoidal cross section.

3. The gas insulated transmission line according to claim 1 including three leg members each extending radially outwardly from said central member and contacting said outer sheath, each of said leg members having an aspect ratio greater than one.

4. The gas insulated transmission line according to claim 3 wherein said three leg members are spaced equidistantly apart from each other about said central member.

5. The gas insulated transmission line according to claim 1 wherein said leg member is disposed at an angle less than 90° with respect to the longitudinal axis of said inner conductor.

6. The gas insulated transmission line according to claim 5 wherein said leg member-inner conductor angle is less than 26.5°.

7. The gas insulated transmission line according to claim 5 wherein said leg member extends downwardly from said inner conductor to said outer sheath.

8. The gas insulated transmission line according to claim 7 including means for trapping particles disposed in the vertically-lowermost section of said transmission line.

9. The gas-insulator transmission line according to claim 5 wherein said transmission line is disposed at an angle to vertical and said leg member extends outwardly from the vertically higher region of said central member.

10. The gas insulated transmission line according to claim 1 wherein said insulating gas is sulfur hexafluoride.

11. A vertically aligned gas insulated transmission line comprising:

an elongated cylindrical outer sheath;

an elongated cylindrical inner conductor disposed within said outer sheath;

an insulating gas disposed within said outer sheath and electrically insulating said inner conductor from said outer sheath;

support means for supporting said inner conductor within said outer sheath said support means comprising an elongated conically-shaped insulator having apex-end and base-end sections and a centrally disposed bore therethrough, said conically-shaped insulator extending radially outwardly to, and contacting said outer sheath, said inner conductor extending through said bore, said conically-shaped insulator being disposed such that the apex-end section of the insulator is vertically higher than the base-end section of the insulator, said conically-shaped insulator and said inner conductor forming an angle therebetween being less than 26.5°.

12. The gas insulated transmission line according to claim 11 including means for trapping particles positioned at the location wherein said conically-shaped insulator contacts said outer sheath.

13. The gas insulated transmission line according to claim 11 including means for trapping particles disposed in the vertically-lowermost section of said transmission line.

14. The gas insulated transmission line according to claim 11 wherein said support means include a post insulator comprising a central member having an opening therethrough and a leg member extending radially outwardly from said central and contacting said outer sheath, said inner conductor extending through said central member opening, said leg member having an aspect ratio greater than one.

15. The gas insulated transmission line according to claim 14 including three leg members each extending radially outwardly from said central member and contacting to said outer sheath, each of said leg members having an aspect ratio greater than one.

16. The gas insulated transmission line according to claim 14 wherein said leg member is disposed at an angle less than 90° with respect to the longitudinal axis of said inner conductor.

17. The gas insulated transmission line according to claim 11 wherein said insulating gas is sulfur hexafluoride.

18. A vertically aligned gas insulated transmission line comprising:

an elongated, cylindrical outer sheath;

an elongated, cylindrical inner conductor disposed within said outer sheath;

an insulating gas disposed within said outer sheath and electrically insulating said inner conductor from said outer sheath;

support means for supporting said inner conductor within said outer sheath;

means for forming a particle trapping region disposed around the radial periphery of said outer sheath, said particle trapping region formed communicating with the interior of said outer sheath; and a deflecting member disposed within said outer sheath for deflecting particles from within said outer sheath to said particle trapping region.

19. The gas insulated transmission line according to claim 18 wherein said deflecting member comprises a conically-shaped member having apex-end and base-end sections with a centrally disposed opening therethrough, said inner conductor extending through said opening, said apex-end section contacting said inner conductor and said base-end section extending outwardly to said particle trapping region, said apex-end section being vertically higher than said base-end section.

20. The gas insulated transmission line according to claim 19 wherein said conically-shaped member is comprised of a soft plastic low dielectric constant material.

21. The gas insulated transmission line according to claim 18 wherein said insulating gas is sulfur hexafluoride.

* * * * *